(12) United States Patent
Yamauchi et al.

(10) Patent No.: US 7,074,515 B2
(45) Date of Patent: Jul. 11, 2006

(54) ELECTROCHEMICAL ELEMENT AND ELECTROCHEMICAL ELEMENT APPARATUS

(75) Inventors: Shiro Yamauchi, Tokyo (JP); Minoru Kimura, Tokyo (JP); Hirokazu Terauchi, Tokyo (JP); Osamu Takai, Nagoya (JP); Goro Yamauchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 294 days.

(21) Appl. No.: 10/212,048

(22) Filed: Aug. 6, 2002

(65) Prior Publication Data

US 2003/0044671 A1    Mar. 6, 2003

(30) Foreign Application Priority Data

Aug. 16, 2001   (JP)   ............................. 2001-247038

(51) Int. Cl.
*H01M 4/86* (2006.01)

(52) U.S. Cl. .................. 429/40; 429/30; 429/42; 429/44

(58) Field of Classification Search ............... 429/40, 429/30, 41, 44, 42; 427/115, 238; 502/100
See application file for complete search history.

(56) References Cited

U.S. PATENT DOCUMENTS 5,631,099 A * 5/1997 Hockaday .................. 429/30

FOREIGN PATENT DOCUMENTS

| JP | 2-298523 | | 12/1990 |
|---|---|---|---|
| JP | 7-134995 | A | 5/1995 |
| JP | 8-164319 | A | 6/1996 |
| JP | 9-245800 | A | 9/1997 |
| JP | 2001-148897 | | 5/2001 |
| JP | 2001-176536 | | 6/2001 |

* cited by examiner

*Primary Examiner*—Laura Weiner
(74) *Attorney, Agent, or Firm*—Sughrue Mion, PLLC

(57) ABSTRACT

Making a larger difference in water activity between electrodes elevates an output voltage of an electrochemical element. The electrochemical element includes a solid electrolyte membrane 5 made of a solid electrolyte and possessing a hydrogen ion conductivity, a first electrode 6 formed on one side of the solid electrolyte membrane 5 and functioning as a catalyst and possessing a hydrophilic property, and a second electrode 7 formed on the other side of the solid electrolyte membrane 5 and functioning as a catalyst and possessing a water-repellent property.

10 Claims, 5 Drawing Sheets

ELECTROCHEMICAL ELEMENT AND ELECTROCHEMICAL ELEMENT APPARATUS

BACKGROUND OF THE INVENTION

1. Field of the Invention

The present invention relates to an electrochemical element for carrying out energy conversion between a chemical energy and an electric energy using a solid electrolyte.

2. Description of Related Art

FIG. 9 is a block diagram of an electrochemical element disclosed in, for example, the Japanese Patent Publication (unexamined) No. 63343/1994 as an energy conversion element using a solid electrolyte. Referring to FIG. 9, a first electrode 2 is formed on one side of a solid electrolyte membrane 1 possessing hydrogen ion conductivity, and a second electrode 3 is formed on the other side of the solid electrolyte membrane 1. Further, the solid electrolyte membrane 1 is, for example, Nafion-117 (trademark) produced by Du Pont de Nemours and Co. The first electrode 2 is a mixed layer of a platinum-plated stainless fiber having a power-feeding performance, an expand metal of titanium, a platinum black functioning as a catalyst, and solid electrolyte components. Further, the second electrode 3 is a mixed layer of a platinum-plated stainless fiber having a power-feeding performance, a platinum black functioning as a catalyst and, solid electrolyte components. Numeral 4 designates a direct current power supply. A plus side of the direct current power supply 4 is connected to the first electrode 2, and a minus side thereof is connected to the second electrode 3.

In the above-mentioned construction, when establishing the first electrode 2 as a high water activity side space (I) on the side of a high humidity, and the second electrode 3 as a low water activity side space (II) on the side of a low humidity, a reaction expressed by the following formula (1) takes place on the side of the first electrode 2, and a reaction expressed by a formula (2) takes place on the side of the second electrode 3:

$$H_2O \rightarrow 2H^+ + (1/2)O_2 + 2e^- \quad (1)$$

$$2H^+ + (1/2)O_2 + 2e^- \rightarrow H_2O \quad (2)$$

That is, decomposition of water takes place at the first electrode 2, while generation of water takes place at the second electrode 3. Accordingly, water moves from the high water activity side space (I) on the side of high humidity to the low waver activity space (II) on the side of low humidity.

Even when the reactions expressed by the mentioned formulas (1) and (2) proceed to the extent that humidity in a space adjacent to the first electrode 2 becomes lower than that in a space adjacent to the second electrode 3, the conditions can be kept. In addition, difference in humidity between the high water activity side space (I) and the low water activity side space (II) can be controlled by application of a voltage. Thus, the humidity control in each space (I) or (II) can be conducted.

In the mentioned conventional electrochemical element, however, an output voltage in the case of collecting an electronic energy utilizing the difference in water activity between the two electrodes 2 and 3 is so low as to be several mv, even if humidity on one surface is set to a level of 100% and humidity on the other surface set to a level of 10% thereby establishing an activity difference by ten times between the two electrodes 2 and 3. Accordingly, a problem exists in that it is difficult to elevate the output voltage.

SUMMARY OF THE INVENTION

The present invention has an object of providing an electrochemical element in which an output voltage can be elevated by establishing a larger difference in water activity between the two electrodes.

The foregoing object is achieved by providing an electrochemical element in which a first electrode functioning as a catalyst and possessing a hydrophilic property is formed on one side of a solid electrolyte membrane composed of a solid electrolyte possessing a hydrogen ion conductivity, and a second electrode functioning as a catalyst and possessing a water-repellent property is formed on the other side of the solid electrolyte membrane. In the electrochemical element of above constitution, output characteristic can be achieved, and consequently output voltage can be elevated.

The foregoing and other object, features, aspects and advantages of the present invention will become more apparent the following detailed description of the present invention when taken in conjunction with the accompanying drawings.

DETAILED DESCRIPTION OF THE INVENTION

Embodiment 1

Figure 1:
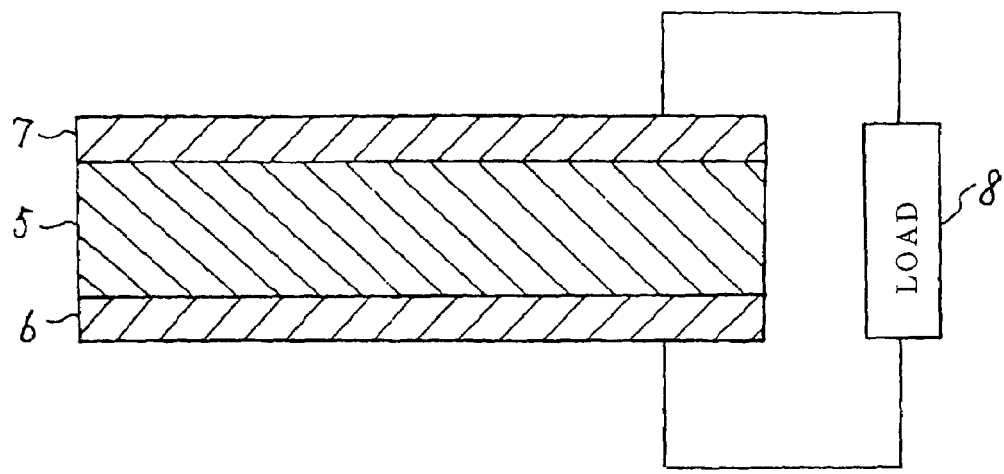
FIG. 1 is a schematic block diagram showing a first preferred embodiment according to the present invention.

FIG. 1 is a schematic block diagram showing a first preferred embodiment. Referring to FIG. 1, reference numeral 5 designates a solid electrolyte membrane, which is a solid electrolyte possessing a hydrogen ion conductivity. As the solid electrolyte membrane 5, for example, Nafion-117 (trade mark) produced by Du Pont de Nemours and Co. is employed. Numeral 6 designates a first electrode functioning as a catalyst and possessing a hydrophilic property. This first electrode 6 is formed on one side of the solid electrolyte membrane 5. The first electrode 6 is formed in such a manner that two types of metal components different in oxidation tendency are made into an alloy, and one metal component having a higher oxidation tendency is oxidized to disperse oxide fine particles 6a on the surface of the first electrode 6. Further the first electrode 6 is press-fitted to the solid electrolyte membrane 5. In forming the first electrode 6, an alloy such as a solid solution of 20% Ti by atom in Pt functioning as a catalyst and having a power-feeding performance is heat-treated at a temperature of 500° C. under 900 atmospheres of pure oxygen. Thus only Ti was precipitated on the surface and an internal part of the alloy in the form of TiO2 particles of anatase type or rutile type. At this time, a concentration gradient of Ti occurs within the alloy to boost dispersion of Ti from the internal part toward the surface thereof. Therefore the surface is coated with hydrophilic TiO2 particles of which area fraction is approximately 70%.

Figure 3:
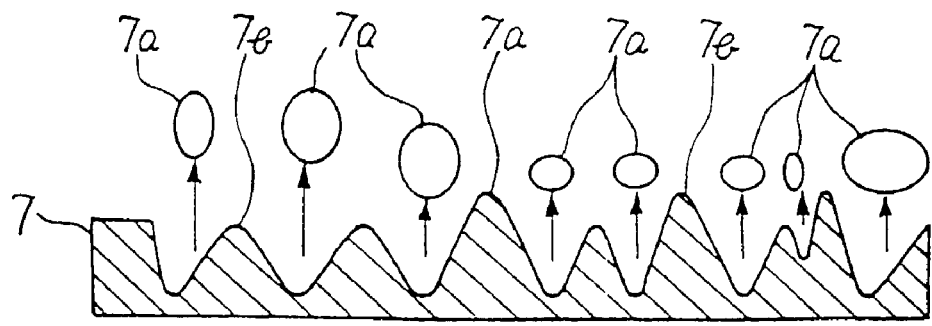
FIG. 3 is a sectional view of a second electrode in FIG. 1.

Numeral 7 designates a second electrode functioning as a catalyst and possessing a water-repellent property. This second electrode 7 is formed on the other side of the solid electrolyte membrane 5. The second electrode 7 is formed in such a manner that two types of metal components different in oxidation tendency are made into an alloy, and one metal component having a higher oxidation tendency is oxidized to selectively remove a resultant second oxide particle 7a that is present on the surface of the alloy. Thus, as shown in FIG. 3, a fractal shaped protrusion 7b was formed. In forming the second electrode 7, an alloy such a solid solution of 15 atomic % Si dissolved in Pt functioning as a catalyst and performing a power-feeding was heat-treated at a temperature of 800° C. under 950 atmospheres of pure oxygen. Thus only Si was precipitated on the surface and the internal part of the alloy in the form of SiO2 particles. As a result of measuring a fractal dimensionality by a method of box counting, a fractal surface having a fractal dimensionality of 2.25 was obtained. On this fractal surface, a predetermined number of protrusions were formed in the range of several nm to several hundred nm. Then, this fractal surface was subjected to a methoxy type silane coupling treatment, whereby the second electrode 7 possessing a super water-repellent property of which contact angle for drops of water was 150 degrees was formed. Numeral 8 designates a load connected between the two electrodes 6 and 7.

Figure 2:
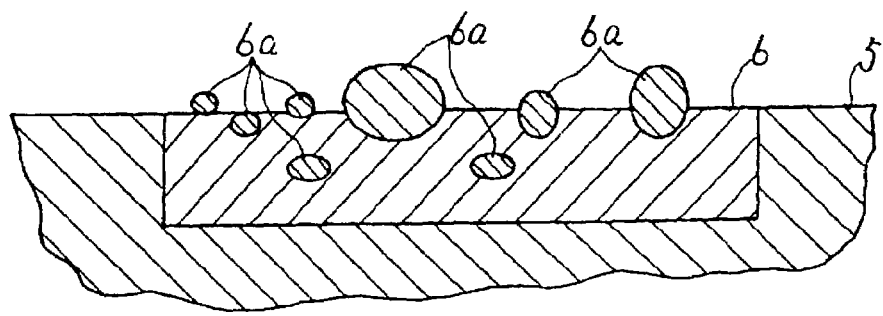
FIG. 2 is a sectional view of a first electrode in FIG. 1.

Now operation of this embodiment is described. Referring FIGS. 1 to 3, when connecting the load 8 between the two electrodes 6 and 7 using the first electrode 6 as the high water activity side space (I) and the second electrode 7 as the low water activity side space (II), a reaction expressed by a formula (3) takes place on the side of the first electrode 6, and a reaction expressed by a formula (4) takes place on the side of the second electrode 7.

$$H_2O \rightarrow 2H^+ + (1/2)O_2 + 2e^- \quad (3)$$

$$2H^+ + (1/2)O_2 + 2e^- \rightarrow H_2O \quad (4)$$

Then, an electromotive force expressed by a formula (5) is generated due to difference in water activity between the two electrodes 6 and 7.

$$E = E_0 + (RT/nF)2.303 \times \text{Log} \frac{[(H_2O)_{(I)}(H^+)^2_{(II)}(O_2)^{(1/2)}_{(II)}]}{[(H_2O)_{(II)}(H^+)^2_{(I)}(O_2)^{(1/2)}_{(I)}]} \quad (5)$$

In the formula (5), (H2O) is a water activity (mmHg), (H$^+$) is a hydrogen ion concentration (mol/L), and (O2) is an oxygen pressure (mmHg). A subscript (I) is a high water activity side, a subscript (II) is a low water activity side, E is an electromotive force (V), and Eo is a theoretical electromotive force with Eo=0. Further, R is a gas constant, T is an absolute temperature [K], F is a Farady constant, and n is a number of a charge transfer with n=2. 2.303 (RT/nF) is 30 mV (when the ratio between the high water activity side (I) and the low water activity side (II) is 10).

Figure 4:
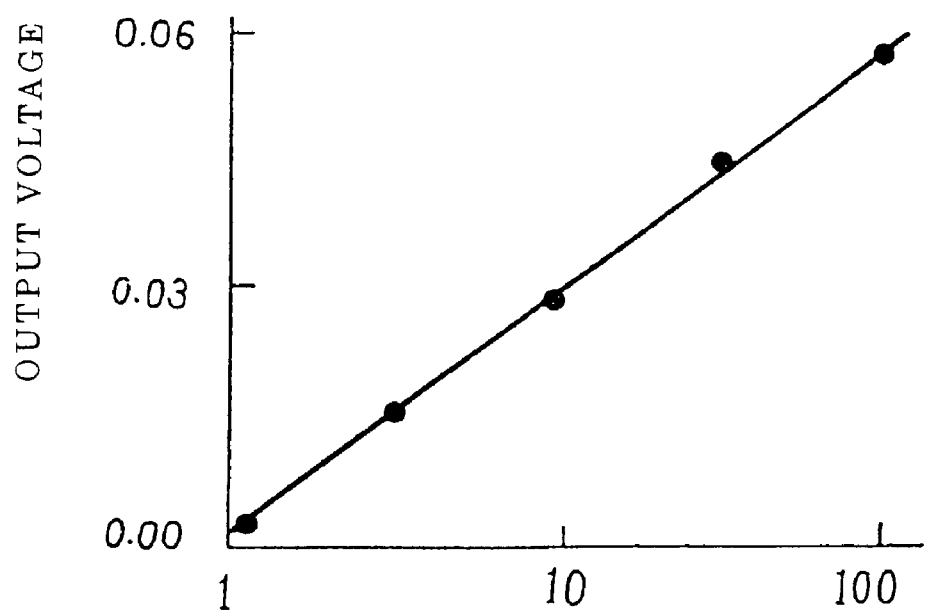
FIG. 4 is a graphic diagram showing an output characteristic of FIG. 1.

In this case, on the assumption that an oxygen concentration in the two space (I) and (II) and a hydrogen ion concentration in the solid electrolyte membrane 5 are constant, an output characteristic as shown in FIG. 4 was obtained. In FIG. 4, a water activity ratio between the high water activity side and the low water activity side is a parameter.

As described above, the electrochemical element according to the first embodiment includes: the solid electrolyte membrane 5 made of the solid electrolyte possessing a hydrogen ion conductivity; the first electrode 6 formed on one side of this solid electrolyte membrane 5 and functioning as a catalyst and possessing a hydrophilic property; and the second electrode 7 formed on the other side of the solid electrolyte membrane 5 and functioning as a catalyst and possessing a water-repellent property. As a result, output characteristic can be improved as shown in FIG. 4 and output voltage can be elevated.

The first electrode 6 is formed by making an alloy of two types of metal components different in oxidation tendency, and oxidizing one metal component of higher oxidation tendency to disperse the first oxide fine particles 6a on the surface of the alloy. Further, the second electrode 7 is formed by making an alloy of two types of metal components different in oxidation tendency, oxidizing one metal component of higher oxidation tendency, and selectively removing the resultant second oxide fine particles 7a present on the surface of the alloy thereby forming protrusions. As a result, improvement in an output characteristic can be achieved as shown in FIG. 4.

Furthermore, the surface of the first electrode is made of a conductor having porosity so as to generate capillary action, thereby improvement in hydrophilic property being achieved.

Further, the surface of the second electrode is formed into a fractal shape, thereby improvement in water-repellent property being achieved. In addition, a fractal surface is a generic term of a configuration having a non-integer dimension, and shows a degree of surface roughness. The degree of the fractal surface is scaled by a fractal dimensionality D, and the D is desired to be not less than 2.01 in this embodiment. If the fractal dimensionality is not more than this value, any surface roughness exerting an effect on the contact angle for water drops will not be expected.

Furthermore, referring to FIG. 1 showing the first embodiment, when using the solid electrolyte 5 of 100 cm$^2$ in area as a dehumidifying element under conditions of 30° C. and 60% RH, a DC power supply is connected thereto in place of the load 8. Thus a back flow of water from the first electrode 6 side to the second electrode 7 side is suppressed, and consequently water transfer performance comes to be 1.6 g/h resulting in considerable improvement as compared with the prior art.

Further in this first embodiment, the first electrode 6 is formed in such a manner that an alloy of two types of metal such as Pt and Ti is formed into a wire rod. This wire rod is then subjected to an internal oxidation, and compressed under a pressure of not less than 3 atmospheres. Thus a wire rod in which hydrophilic TiO2 particles are dispersed is formed, and this wire rod is formed into a web shape. On the other hand, the second electrode 7 is formed as in such a manner that TiO2 particles are removed from the wire rod surface in which the hydrophilic TiO2 particles are dispersed, and then subjected to the methoxysilane coupling treatment thereby obtaining a water-repellent property. This wire rod is then formed into a web shape eventually forming the second electrode 7. Then the solid electrolyte membrane 5 is interposed between the first electrode 6 and the second electrode 7, and fixed there by means of a hot press (190° C., 30 Kg/cm$^2$ whereby a similar advantage is expected.

Embodiment 2

Figure 5:
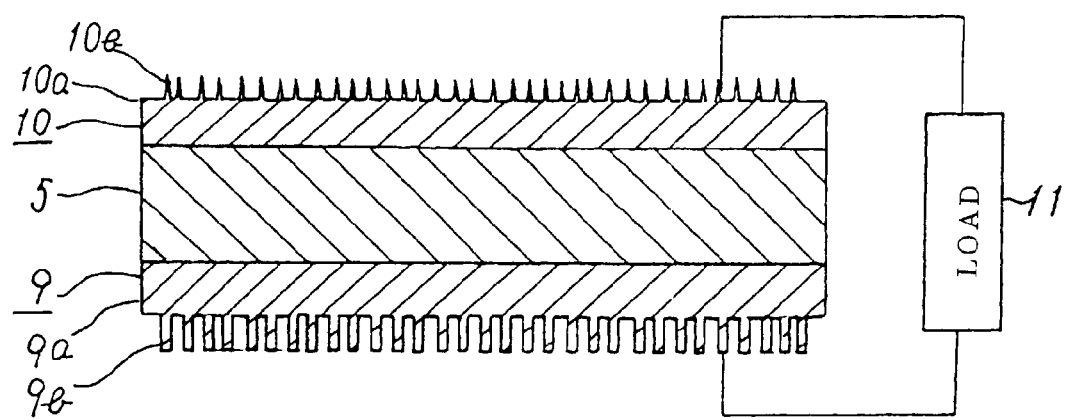
FIG. 5 is a schematic block diagram showing a second embodiment of the invention.

FIG. 5 is a schematic block diagram showing a second preferred embodiment. In FIG. 5, reference numeral 5 designates the same the solid electrolyte membrane 5 as in the first embodiment. Numeral 9 designates a first electrode formed on one side of the solid electrolyte membrane 5. This first electrode 9 is composed of a reaction part 9a functioning as a catalyst on the side adjacent to the solid electrolyte membrane 5, and a hydrophilic part 9b possessing a hydrophilic property on the surface of the mentioned reaction part 9a. The hydrophilic part 9b is made of a porous metal obtained, for example, by platinum-plating a titanium surface, and is formed so as to perform a capillary action by establishing a larger ratio between a depth direction and a pore diameter. Numeral 10 designates a second electrode formed on the other side of the solid electrolyte membrane 5. This second electrode 10 is composed of a reaction part 10a functioning as a catalyst on the side adjacent to the solid electrolyte membrane 5, and a water-repellent part 10b possessing a water-repellent property on the surface of the reaction part 10a. In addition, the water-repellent part 10b is formed in such a manner that a mixed layer of a fluorine compound having a CF3 terminal group and containing 1% to 30% fluorine and platinum serving as a catalyst is formed into a protrusion by a plasma CVD in which a silane fluoride and platinum are employed as basic materials. The protrusion is several nm to several hundred nm in height. Numeral 11 designates a load connected between the two electrodes 9 and 10.

Now operation of this embodiment is described. Referring to FIG. 5, when connecting the load 11 between the two electrodes 9 and 10 using the first electrode 9 as the high water activity side space (I) and the second electrode 10 as the low water activity side space (II), the reaction expressed by the formula (3) takes place on the side of the first electrode 9, and the reaction expressed by the formula (4) takes place on the side of the second electrode 10. Then an electromotive force expressed by the formula (5) caused by difference in water activity between the two electrodes 9 and 10. In this case, assuming that oxygen concentration in the two spaces (I) and (II) and hydrogen ion concentration in the solid electrolyte membrane 5 are constant, an output characteristic of 500 mv and 200 μA per 0.8 cm$^2$ was obtained.

As described above, the electrochemical element according to the first embodiment includes: the solid electrolyte membrane 5 made of the solid electrolyte possessing a hydrogen ion conductivity; the first electrode 9 formed on one side of this solid electrolyte membrane 5 and functioning as a catalyst and possessing a hydrophilic property; and the second electrode 10 formed on the other side of the solid electrolyte membrane 5 and functioning as a catalyst and possessing a water-repellent property. As a result, output characteristic can be improved as shown in FIG. 4 and output voltage can be elevated.

In the foregoing first and second embodiments, it is also preferable that a mixture consisting of 55 to 95 weight % polytetrafluoroethylene (PTFE) particles, 5 to 35 weight % polyvinylidene fluoride (PVDF) and 1 to 5 weight % perfluoroether is adhered to the second electrode 7 and 10. As a result, the water-repellent property of the second electrode 7, 10 can be improved.

Note that, in the case of PTFE being not more than 55%, any water-repellent property is not demonstrated, and in the case of PTFE being not less than 95%, any adhesive force is not demonstrated. Further, in the case of PVDF being not more than 5%, there is no adhesive strength, and in the case of PVDF being not less than 5%, the water-repellent property is lowered. Moreover, in the case of perfluoroether being not more than 1%, the water-repellent property is not maintained, and in the case of perfluoroether being not less than 5%, the water-repellent property is lowered.

Embodiment 3

Figure 6:
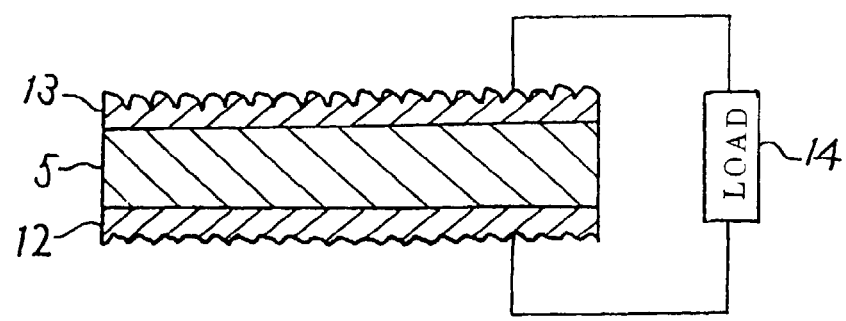
FIG. 6 is a schematic block diagram showing a third embodiment of the invention.

FIG. 6 is a schematic block diagram showing a third preferred embodiment. Referring to FIG. 6, reference numeral 5 designates the same solid electrolyte membrane as in the foregoing first embodiment. Numeral 12 designates a first electrode formed by Pt electroless plating on one side of the solid electrolyte membrane 5 and functioning as a catalyst. A surface of the first electrode 12 is irradiated with at least one of plasma, vacuum ultraviolet light and ozone gas thereby providing hydrophilicity. It is preferable that the first electrode 12 is provided with hydrophilicity by depositing and adhering a substance having a hydrophilic group onto the first electrode 12. Numeral 13 designates a second electrode formed by Pt electroless plating on the other side of the solid electrolyte membrane 5 and functioning as a catalyst. Using either an organic compound or an organic fluorine compound as a raw material, a water-repellent component is deposited and adhered to the surface of the second electrode 13 by any of CVD, sputtering, vapor deposition and dipping. For example, by conducting a low-temperature plasma reaction using an organic silicone compound, a water-repellent silicone oxide membrane such as tetramethylsilane or trimethylmethoxysilane can be deposited and adhered thereto. Also by conducting a chemical vapor deposition (CVD) using an organic silicone compound (tetramethylsilane, tetraethoxysilane or the like) and organic fluorine compound (fluoroalkylsilane or the like), a water-repellent silicone membrane possessing a water-repellent property can be deposited and adhered thereto (see FIG. 7).

Further, by conducting a sputtering method using polytetraoroethylene being an organic fluorine compound as a target, a water-repellent polyhtetrafuloroetylene membrane can be adhered and deposited onto the second electrode 13. Likewise, by conducting a vapor deposition using polytetrafuloroethylene as a sputtering material, a water-repellent polytetrafluoroethylene membrane can be adhered and deposited onto the second electrode 13. Furthermore, by dispersing polyvinylidene fluoride in a solvent and conducting a dipping, a water-repellent fluorine compound membrane can be deposited and adhered onto the second electrode 13. Numeral 14 designates a load connected between the two electrodes 12 and 13.

Figure 7:
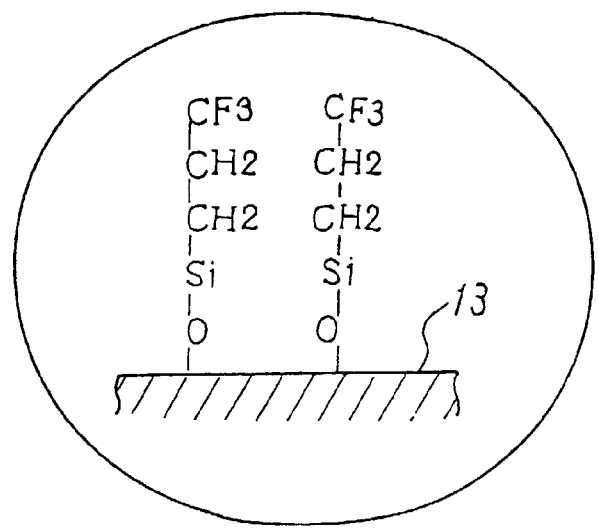
FIG. 7 is an explanatory diagram showing an essential part of FIG. 6.

Now operation thereof is described. Referring to FIGS. 6 and 7, when connecting the load 14 between the two electrodes 12 and 13 using the first electrode 12 as the high water activity space (I) and the second electrode 13 as the low water activity space (II), the reaction expressed by the formula (3) takes place on the side of the first electrode 12, and the reaction expressed by the formula (4) takes place on the side of the second electrode 13. Then an electromotive force expressed by the formula (5) is generated due to a water activity difference between the two electrodes 12 and 13.

In this case, assuming that an oxygen concentration in the two spaces (I) and (II) and a hydrogen ion concentration in the solid electrolyte membrane 5 are constant, an output characteristic shown in FIG. 4 was obtained. A water activity ratio between the high water activity side and the low water activity side is a parameter.

As described above, the solid electrolyte membrane 5 possessing a hydrogen ion conductivity and the surface of the first electrode 12 formed on one side of the solid electrolyte membrane and functioning as a catalyst and possessing a hydrophilic property 5 was irradiated with at least any of plasma, vacuum ultraviolet light and ozone gas, whereby a super hydrophilic property of which contact angle for water drop is 0 degree was obtained. Further, a decomposite obtained by decomposing perfluoroalkyl-silane using a plasma CVD was deposited and adhered to the second electrode 13 formed on the other side of the solid electrolyte membrane 5 and functioning as a catalyst and possessing a water-repellent property, whereby a super water-repellent property of which contact angle for water drops is 150 degrees was obtained.

As described above, the electrochemical element according to the first embodiment includes: the solid electrolyte membrane 5 made of the solid electrolyte possessing a hydrogen ion conductivity; the first electrode 12 formed on one side of this solid electrolyte membrane 5 and functioning as a catalyst and possessing a hydrophilic property; and the second electrode 13 formed on the other side of the solid electrolyte membrane 5 and functioning as a catalyst and possessing a water-repellent property. As a result, output characteristic can be improved as shown in FIG. 4 and output voltage can be elevated.

Embodiment 4

Figure 8:
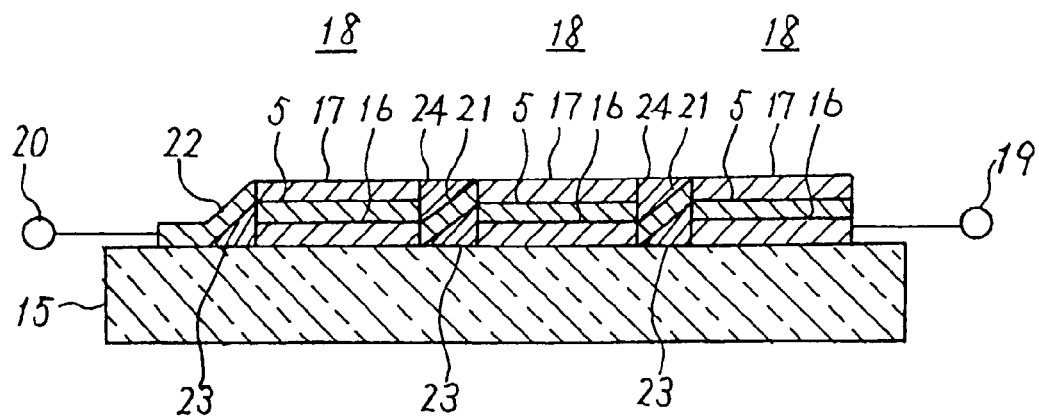
FIG. 8 is a schematic block diagram showing a fourth embodiment of this invention.
Figure 9:
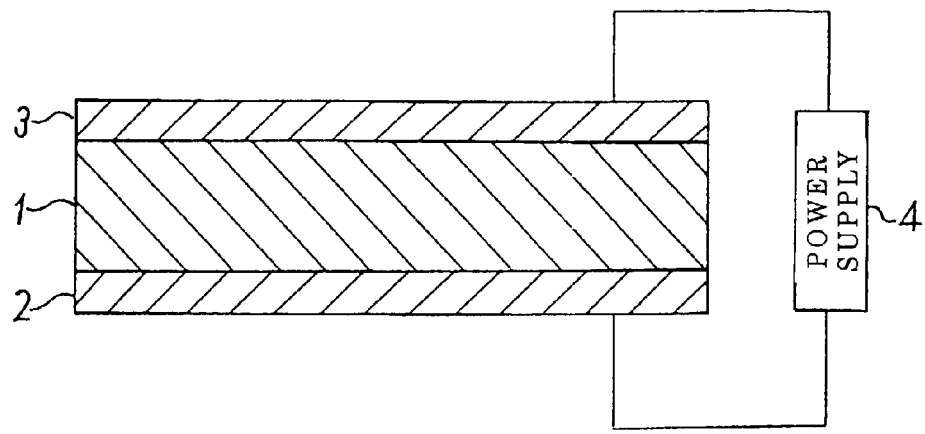
FIG. 9 is a schematic block diagram showing an electrochemical element according to the prior art.

FIG. 8 is a schematic block diagram showing a fourth preferred embodiment. Referring to FIG. 8, reference numeral 5 is the same solid electrolyte membrane as in the foregoing first embodiment. Numeral 15 designates a flat plate-shaped base body having insulation performance, made of a porous ceramic, for example. Numeral 16 designates a first electrode made of a conductor such as metal or ceramic, formed at intervals of a predetermined distance on the base body 15 and functioning as a catalyst and possessing a hydrophilic property. This first electrode 16 is formed so as to generate a capillary action by establishing a larger ratio between a depth direction and a pore diameter. In addition, the solid electrolyte membrane 5 is formed so that top surface of the first electrode 16 and one side of the solid electrolyte membrane 5 come in contact. Numeral 17 designates a second electrode formed on the other side of the solid electrolyte membrane 5, and this second electrode 17 functions as a catalyst and possesses a water-repellent property. The components indicated by 15 to 17 integrally form an electrochemical element 18. Numeral 19 designates a first terminal, which is connected to the first electrode at a right end in the drawing. Numeral 20 designates a second terminal, which is connected to the second electrode at a left end in the drawing through a later-mentioned connector 22. Numeral 21 designates a connector, which provides a connection between the first electrode 16 of one of the adjacent electrochemical elements 18 and the second electrode 17 of the other electrochemical element 18. Numeral 22 designates a connector, which provides a connection between the second electrode 17 and the second terminal 20 located at the left end in the drawing. Numeral 23 designates an insulator such as alumina, and this insulator 23 provides insulation between the solid electrolyte membrane 5 and first electrode 16, and each of the connectors 21 and 22. Numeral 24 designates an insulator such as alumina, and this insulator 24 provides insulation between the solid electrolyte membrane 5 and second electrode 17, and the connector 21.

In the above-mentioned construction, when connecting a load (not shown) between the two electrodes 16 and 17 using the base body 15 on the first electrode 16 side as the high water activity side and the second electrode 17 side as the low water activity side, an output voltage in proportion to the series-connected electrochemical element 18 was obtained in accordance with a difference in water activity between the two electrodes 16 and 17.

In the mentioned electrochemical element according to the fourth embodiment, a plurality of electrochemical elements 18 being series-connected is described as an example. However, it is preferable that either the electrochemical element is constructed of a single electrochemical element 18 to be used as a single unit, or plural pieces of electrochemical elements are series-connected. In either construction, a similar advantage can be expected.

Further, in this fourth embodiment, the electrochemical element 18 being formed on the flat plate-shaped base body 15 is described as an example. However, by forming the base body 15 cylindrical, forming the electrochemical element 18 on an inner surface of the cylindrical base body 15, and passing through inside the cylinder, electric power can be obtained.

Furthermore, by using $SrCeO_3$ as the solid electrolyte possessing a hydrogen ion conductivity, an electric energy can be extracted from a vapor energy at a high temperature of not less than 300° C.

ADDITIONAL DESCRIPTION OF THE INVENTION

Further, in the invention, it is also preferable that the electrochemical element includes: a solid electrolyte membrane made of a solid electrolyte possessing a hydrogen ion conductivity; a first electrode formed on one side of this solid electrolyte membrane and functioning as a catalyst and possessing a hydrophilic property which electrode; and a second electrode formed on the other side of the solid electrolyte membrane and functioning as a catalyst and possessing a water-repellent property; in which the electrochemical element is disposed on a base body having insulation performance and porosity. As a result, number of the series-connected electrochemical elements can be freely set without restriction.

In the invention, it is also preferable that the electrochemical element includes: a solid electrolyte membrane made of a solid electrolyte possessing a hydrogen ion conductivity; a first electrode formed on one side of this solid electrolyte membrane and functioning as a catalyst and possessing a hydrophilic; and a second electrode formed on the other side of the solid electrolyte membrane and functioning as a catalyst and possessing a water-repellent property; in which plural electrochemical elements are disposed on a base body having an insulation performance and porosity, and the first electrode of one of the adjacent electrochemical elements and the second electrode of the other electrochemical element are connected to each other. As a result, output characteristic can be improved, and consequently output voltage can be elevated.

In the invention, it is also preferable that the electrochemical element includes: a solid electrolyte membrane made of a solid electrolyte and possessing a hydrogen ion conductivity; a first electrode formed on one side of the solid electrolyte membrane and functioning as a catalyst and possessing a hydrophilic property; and a second electrode formed on the other side of the solid electrolyte membrane and functioning as a catalyst and possessing a water-repellent; in which the electrochemical element is disposed on an inner or outer surface of a cylindrical base body having an insulation performance and porosity. As a result, electric power can be obtained by passing a water vapor through inside the cylinder.

What is claimed is:

1. An electrochemical element comprising: a solid electrolyte membrane composed of a solid electrolyte and possessing a hydrogen ion conductivity; a first electrode formed on one side of said solid electrolyte membrane and functioning as a catalyst and possessing a hydrophilic property; and a second electrode formed on the other side of said solid electrolyte membrane and functioning as a catalyst and possessing a water-repellent property;

said first electrode comprising an alloy comprising two metal components, Ti and Pt, which are different in oxidation tendency, and wherein a concentration gradient of the metal component having the higher oxidation tendency exists within the alloy, such that the concentration of the metal component having the higher oxidation tendency increases toward an outer surface of the first electrode, and the outer surface has dispersed thereon hydrophilic particles of an oxide of the metal component having the higher oxidation tendency.

2. The electrochemical element according to claim 1, wherein a water-repellent component is deposited and adhered to the surface of the second electrode.

3. The electrochemical element according to claim 2, wherein the surface of the first electrode is made of a conductor having porosity to generate capillary action.

4. The electrochemical element according to claim 1, wherein using, either an organic compound or an organic fluorine compound as a raw material, a water-repellent component is deposited and adhered to the surface of the second electrode, by any of CVD sputtering, vapor deposition and dipping.

5. The electrochemical element according to claim 1, wherein said electrochemical element is disposed on an inner or outer surface of a cylindrical base body having an insulation performance and porosity.

6. The electrochemical element according to claim 1, said second electrode comprising an alloy comprising two metal components different in oxidation tendency, wherein an outer surface of the second electrode has irregular-, needle-like- or fractal-shaped protrusions thereon which have been formed by selective removal therefrom of particles of an oxide of the metal component of the alloy of the second electrode having the higher oxidation tendency.

7. The electrochemical element according to claim 6, wherein the outer surface of the second electrode is further subjected to a methoxysilane coupling treatment.

8. The electrochemical element according to claim 6, wherein a mixture consisting of 55 to 95 weight % polytetrafluoroethylene (PTFE) particles, 5 to 35 weight % polyvinylidene fluoride (PVDF) and 1 to 5 weight % perfluoroether is adhered to the second electrode.

9. An electrochemical element apparatus comprising: a solid electrolyte membrane made of a solid electrolyte possessing a hydrogen ion conductivity; a first electrode formed on one side of said solid electrolyte membrane and functioning as a catalyst and possessing a hydrophilic property; and a second electrode formed on the other side of said solid electrolyte membrane and functioning as a catalyst and possessing a water-repellent property;

said first electrode comprising an alloy comprising two metal components, Ti and Pt which are different in oxidation tendency;

wherein a concentration gradient of the metal component having the higher oxidation tendency exists within the alloy, such that the concentration of the metal component having the higher oxidation tendency increases toward an outer surface of the first electrode, and the outer surface has dispersed thereon hydrophilic particles of an oxide of the metal component having the higher oxidation tendency; and wherein said electrochemical element is disposed on a base body having insulation performance and porosity.

10. An electrochemical element comprising: a solid electrolyte membrane made of a solid electrolyte possessing a hydrogen ion conductivity; a first electrode formed on one side of said solid electrolyte membrane and functioning as a catalyst and possessing a hydrophilic property; and a second electrode formed on the other side of said solid electrolyte membrane and functioning as a catalyst and possessing a water-repellent properly;

said first electrode comprising an alloy comprising two metal components, Ti and Pt which are different in oxidation tendency;

wherein a concentration gradient of the metal component having the higher oxidation tendency exists within the alloy, such that the concentration of the metal component having the higher oxidation tendency increases toward an outer surface of the first electrode, and the outer surface has dispersed thereon hydrophilic particles of an oxide of the metal component having the higher oxidation tendency; and wherein a plurality of said electrochemical elements are disposed on a base body having an insulation performance porosity, and said first electrode of one of the adjacent electrochemical elements and said second electrode of the other electrochemical element are connected to each other.

* * * * *